(12) United States Patent
Marti et al.

(10) Patent No.: US 11,843,475 B2
(45) Date of Patent: *Dec. 12, 2023

(54) RULE-BASED MODELING FOR BUILDING CONTROL SYSTEMS

(71) Applicant: Honeywell International Inc., Charlotte, NC (US)

(72) Inventors: Jerry Marti, West Salem, OH (US); Michael Haling, Broadview Heights, OH (US); Debra Lynn Pugel, Kent, OH (US); Prabhat Ranjan, Bangalore (IN)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/747,807

(22) Filed: May 18, 2022

(65) Prior Publication Data
US 2022/0278865 A1 Sep. 1, 2022

Related U.S. Application Data

(63) Continuation of application No. 15/994,312, filed on May 31, 2018, now Pat. No. 11,349,683.

(51) Int. Cl.
*H04L 12/28* (2006.01)
*G06F 3/04847* (2022.01)

(52) U.S. Cl.
CPC ...... *H04L 12/2814* (2013.01); *G06F 3/04847* (2013.01); *H04L 12/281* (2013.01); *H04L 12/2812* (2013.01)

(58) Field of Classification Search
CPC ............... H04L 12/281; H04L 12/2812; H04L 12/2814; G06F 3/04847; G05B 2219/2642; G05B 15/02
See application file for complete search history.

(56) References Cited

U.S. PATENT DOCUMENTS 8,055,387 B2 11/2011 McCoy et al.
8,682,921 B2 3/2014 Park et al.
(Continued)

OTHER PUBLICATIONS

Prairie et al., "Project Haystack", https://project-haystack.org/file/22/CABA-White-Paper-on-Project-Haystack.pdf, 25 pgs., Feb. 2016.
(Continued)

*Primary Examiner* — Santosh R Poudel
(74) *Attorney, Agent, or Firm* — Seager, Tufte & Wickhem, LLP

(57) ABSTRACT

Rule-based modeling for building control systems is described herein. One device includes a memory, a user, interface, and a processor configured to execute executable instructions stored in the memory to display, in a single view on the user interface, a listing of all components of a facility controlled by a building control system, display, in an additional view on the user interface, a number of rules for mapping the components of the facility to a common model of the building control system, map the components of the facility to the common model by applying the number of rules to the components of the facility, and display, in the additional view on the user interface, the components of the facility that have been mapped to the common model.

17 Claims, 7 Drawing Sheets

(56) References Cited

U.S. PATENT DOCUMENTS

| | | | |
|---|---|---|---|
| 9,589,291 B1* | 3/2017 | Yalamanchi | G06Q 30/0625 |
| 2003/0006999 A1 | 1/2003 | Carlson et al. | |
| 2003/0007000 A1 | 1/2003 | Carlson et al. | |
| 2006/0058923 A1 | 3/2006 | Kruk et al. | |
| 2007/0067062 A1 | 3/2007 | Mairs et al. | |
| 2007/0168060 A1 | 7/2007 | Nixon et al. | |
| 2010/0169798 A1 | 7/2010 | Hyndman et al. | |
| 2011/0055748 A1 | 3/2011 | Vacariuc | |
| 2011/0087650 A1 | 4/2011 | Mackay et al. | |
| 2011/0113360 A1* | 5/2011 | Johnson | H04L 12/2825 |
| | | | 340/635 |
| 2012/0221956 A1 | 8/2012 | Geadelmann et al. | |
| 2012/0315933 A1* | 12/2012 | Klassen | G06F 16/58 |
| | | | 455/466 |
| 2013/0218349 A1* | 8/2013 | Coogan | G05B 13/02 |
| | | | 700/275 |
| 2014/0067424 A1* | 3/2014 | Ramakrishnan | G16H 40/63 |
| | | | 705/3 |
| 2014/0282020 A1 | 9/2014 | Piper et al. | |
| 2015/0091778 A1 | 4/2015 | Day et al. | |
| 2015/0135117 A1 | 5/2015 | Rajappa et al. | |
| 2015/0248232 A1 | 9/2015 | Brown et al. | |
| 2016/0041718 A1 | 2/2016 | Wood et al. | |
| 2016/0164748 A1* | 6/2016 | Kim | H04L 12/403 |
| | | | 706/47 |
| 2016/0359664 A1 | 12/2016 | Malegaonkar et al. | |
| 2017/0054757 A1* | 2/2017 | Siswick | G06F 3/04817 |
| 2017/0357227 A1 | 12/2017 | Kummer | |
| 2018/0088789 A1 | 3/2018 | Han et al. | |
| 2018/0120793 A1* | 5/2018 | Tiwari | G06Q 10/06 |
| 2018/0260249 A1 | 9/2018 | Przybylski | |

OTHER PUBLICATIONS

Application No./Patent No. 19177462.9-1205, Extended European Search Report, p. 10, dated Nov. 6, 2019.

* cited by examiner

| Network or Device | station:|slot:/Drivers/US_1373GarnerNC | | | Edit Model Mapper | | Edit Point Exclusion List | | |
|---|---|---|---|---|---|---|---|---|
| Total Points: 216 | Total Points Related: 162 | Total Points Tagged: 0 | 0% Modeled | | | | | |
| Device | Point Name | Equipment/Point Type | Relation Id | Relates To | Marker | Entity Type | Entity Class | Component Type | Point Source |
| | Monitor | | | | | | | logicOneExec:Op | slot:/Drivers/US_1373GarnerNC |
| | Tuning Polic | | | | | | | driver:TuningPolic | slot:/Drivers/US_1373GarnerNC |
| | Default Polic | | | | | | | driver:TuningPolic | slot:/Drivers/US_1373GarnerNC |
| | Background | | | | | | | devDriver:DdlWor | slot:/Drivers/US_1373GarnerNC |
| | Watch Dog I | | | | | | | logicOneExec:Tra | slot:/Drivers/US_1373GarnerNC |
| US_1373Ga | | | | | | | | | slot:/Drivers/US_1373GarnerNC |
| US_1373Ga | | | hs:siteRef | US_1373G | | | | modelmgr:Site | slot:/Drivers/US_1373GarnerNC |
| US_137 | RACKLTB (- | | | | | | | logicOneExec:Rc | slot:/Drivers/US_1373GarnerNC |
| US_137 | OUTPUT X | | | | | | | logicOneExec:Log | slot:/Drivers/US_1373GarnerNC |
| US_137 | OUTPUT Y | | | | | | | logicOneExec:Log | slot:/Drivers/US_1373GarnerNC |
| US_137 | PHASE LOS | RackInput | hs:equipRe | RACK LTB | | | | logicOneExec:Log | slot:/Drivers/US_1373GarnerNC |
| US_137 | Emergency | | | | | point | | logicOneExec:Log | slot:/Drivers/US_1373GarnerNC |
| US_137 | Outdoor Lig | | | | | point | | logicOneExec:Log | slot:/Drivers/US_1373GarnerNC |
| US_137 | Outside Air | | | | | point | | logicOneExec:Log | slot:/Drivers/US_1373GarnerNC |
| US_137 | COM | | | | | | | logicOneExec:Log | slot:/Drivers/US_1373GarnerNC |
| US_137 | COMP B1 | CompressorOutput | hs:equipRe | Compresso | | point | | logicOneExec:Log | slot:/Drivers/US_1373GarnerNC |
| US_137 | COMP B2 | CompressorOutput | hs:equipRe | Compresso | | point | | logicOneExec:Log | slot:/Drivers/US_1373GarnerNC |
| US_137 | COMP B3 | CompressorOutput | hs:equipRe | Compresso | | point | | logicOneExec:Log | slot:/Drivers/US_1373GarnerNC |
| US_137 | COMP B4 | CompressorOutput | hs:equipRe | Compresso | | point | | logicOneExec:Log | slot:/Drivers/US_1373GarnerNC |
| US_137 | B11 Dairy | | | | | | | logicOneExec:Log | slot:/Drivers/US_1373GarnerNC |
| US_137 | COMP B2 U | CompressorUnloader | hs:equipRe | Compresso | | point | | logicOneExec:Log | slot:/Drivers/US_1373GarnerNC |
| US_137 | COMP B4 U | CompressorUnloader | hs:equipRe | Compresso | | point | | logicOneExec:Log | slot:/Drivers/US_1373GarnerNC |
| US_137 | RIM | | | | | | | logicOneExec:Log | slot:/Drivers/US_1373GarnerNC |
| US_137 | COMP B1 L | CompressorInput | hs:equipRe | Compresso | | point | | logicOneExec:Log | slot:/Drivers/US_1373GarnerNC |
| US_137 | COMP B2 L | CompressorInput | hs:equipRe | Compresso | | point | | logicOneExec:Log | slot:/Drivers/US_1373GarnerNC |
| US_137 | COMP B3 L | CompressorInput | hs:equipRe | Compresso | | point | | logicOneExec:Log | slot:/Drivers/US_1373GarnerNC |
| US_137 | COMP B4 L | CompressorInput | hs:equipRe | Compresso | | point | | logicOneExec:Log | slot:/Drivers/US_1373GarnerNC |
| US_137 | REC FLOAT | RackInput | hs:equipRe | Rack LTB | | point | | logicOneExec:Log | slot:/Drivers/US_1373GarnerNC |
| US_137 | REC PSIG R | RackInput | hs:equipRe | Rack LTB | | point | | logicOneExec:Log | slot:/Drivers/US_1373GarnerNC |
| US_137 | COMP B1 A | CompressorInput | hs:equipRe | Compresso | | point | | logicOneExec:Log | slot:/Drivers/US_1373GarnerNC |
| US_137 | COMP B2 A | CompressorInput | hs:equipRe | Compresso | | point | | logicOneExec:Log | slot:/Drivers/US_1373GarnerNC |
| US_137 | COMP B3 A | CompressorInput | hs:equipRe | Compresso | | point | | logicOneExec:Log | slot:/Drivers/US_1373GarnerNC |

Reset View

*Fig. 3*

Model Mapper — 442

| Network | station:|slot:/Drivers/US_1373GarnerNC |
|---|---|
| Brand | StoreBrand |
| Vendor | BASSystem |
| Model Entity | circuit |

Matched Entities - 28

| Name | Type |
|---|---|
| B11 Dairy | logicOneExec:LogicOneBooleanPoint |
| B1 DEFROST | logicOneExec:LogicOneBooleanPoint |
| B1 FF DRS-ONRIZH | logicOneExec:LogicOneBooleanPoint |
| B2 DEFROST | logicOneExec:LogicOneBooleanPoint |
| B2 FF DRS-ONRIZH | logicOneExec:LogicOneBooleanPoint |
| B3 DEFROST | logicOneExec:LogicOneBooleanPoint |
| B3 *FF DRS-ONRIZH | logicOneExec:LogicOneBooleanPoint |
| B4 DEFROST | logicOneExec:LogicOneBooleanPoint |
| B4 FF DRS-ONRIZH | logicOneExec:LogicOneBooleanPoint |
| B5 DEFROST | logicOneExec:LogicOneBooleanPoint |
| B5 FF DRS-ONRIZH | logicOneExec:LogicOneBooleanPoint |
| B6 DEFROST | logicOneExec:LogicOneBooleanPoint |
| B6 FF DRS-ONRIZH | logicOneExec:LogicOneBooleanPoint |
| B7 DEFROST | logicOneExec:LogicOneBooleanPoint |
| B7 FF DRS-ONRIZH | logicOneExec:LogicOneBooleanPoint |
| B8 DEFROST | logicOneExec:LogicOneBooleanPoint |
| B8 FF DRS-ONRIZH | logicOneExec:LogicOneBooleanPoint |
| B9 DEFROST | logicOneExec:LogicOneBooleanPoint |
| B9 GROC   FZR | logicOneExec:RefrigCircuit |
| B1 FF DRS-ONRIZH | logicOneExec:RefrigCircuit |
| B2 FF DRS-ONRIZH | logicOneExec:RefrigCircuit |
| B3 FF DRS-ONRIZH | logicOneExec:RefrigCircuit |
| B4 FF DRS-ONRIZH | logicOneExec:RefrigCircuit |
| B5 FF DRS-ONRIZH | logicOneExec:RefrigCircuit |
| B6 FF DRS-ONRIZH | logicOneExec:RefrigCircuit |
| B7 FF DRS-ONRIZH | logicOneExec:RefrigCircuit |

Filters

Included Patterns

| Pattern |
|---|
| \w\d+[\*].* |

Property Rules

| Rule |
|---|

Included Types

| Rule |
|---|

Excluded Patterns

| Pattern |
|---|
| .*EVAP FAN.* |

Load File | Save to File | Apply Filters

Demo copy of Niagara AX Not for resale

| | | |
|---|---|---|
| 🗑 caseTemp (Model Match Rule) | | |
| ▷ | Condition | Model Match Condition |
| ▽ ⭕ | Tag List | Tag Info List |
| ▷ | caseTemp | Marker |
| ▷ | casePerformance | Map Numeric Point Tag |
| ▷ | caseDeviation | Map Numeric Point Tag |
| ▷ | no:entityType | Model Type Tag |
| ▷ | refrig | Marker |
| ▷ | hs:refrig | Marker |
| ▷ ⭕ | Tag Group List | Tag Group Info List |
| ▷ ⭕ | Relation List | Relation Info List |

RULE-BASED MODELING FOR BUILDING CONTROL SYSTEMS

This is a continuation of co-pending U.S. patent application Ser. No. 15/994,312, filed May 31, 2018 and entitled "RULE-BASED MODELING FOR BUILDING CONTROL SYSTEMS", which is incorporated herein by reference.

TECHNICAL FIELD

The present disclosure relates generally to rule-based modeling for building control systems.

BACKGROUND

Building control systems, as used herein, describe complex systems that may control multiple devices as a group that are associated with a building, multiple groups of devices within a building, and/or devices of multiple buildings within a campus or devices of multiple buildings dispersed in different locations. For example, a building control system can be used to monitor and control the operation of multi-site retail facilities from a central location via the intranet of the facilities. Accordingly, when a building control system for a site is to be added to a building management system (BMS), which manages one or more of the control settings or operations of the building control system, the setup of this building control system within the BMS can be complex and time consuming.

Currently, there is no existing system which can help a system integrator (SI) (e.g., a person tasked with the setup of the building control system into the BMS) configure the BMS without physically visiting the site that is being controlled by the building control system. This can involve travel to each individual site, cost for accommodations, time to manually review the system can to determine device types and other device information, increased complexity in deployment, and other business costs.

BRIEF DESCRIPTION OF THE DRAWINGS

FIG. 3 illustrates an example screen shot displayed during a rule-based modeling for a building control system in accordance with an embodiment of the present disclosure.

FIG. 4 illustrates an example screen shot displayed during a rule-based modeling for a building control system in accordance with an embodiment of the present disclosure.

DETAILED DESCRIPTION

Figure 1:
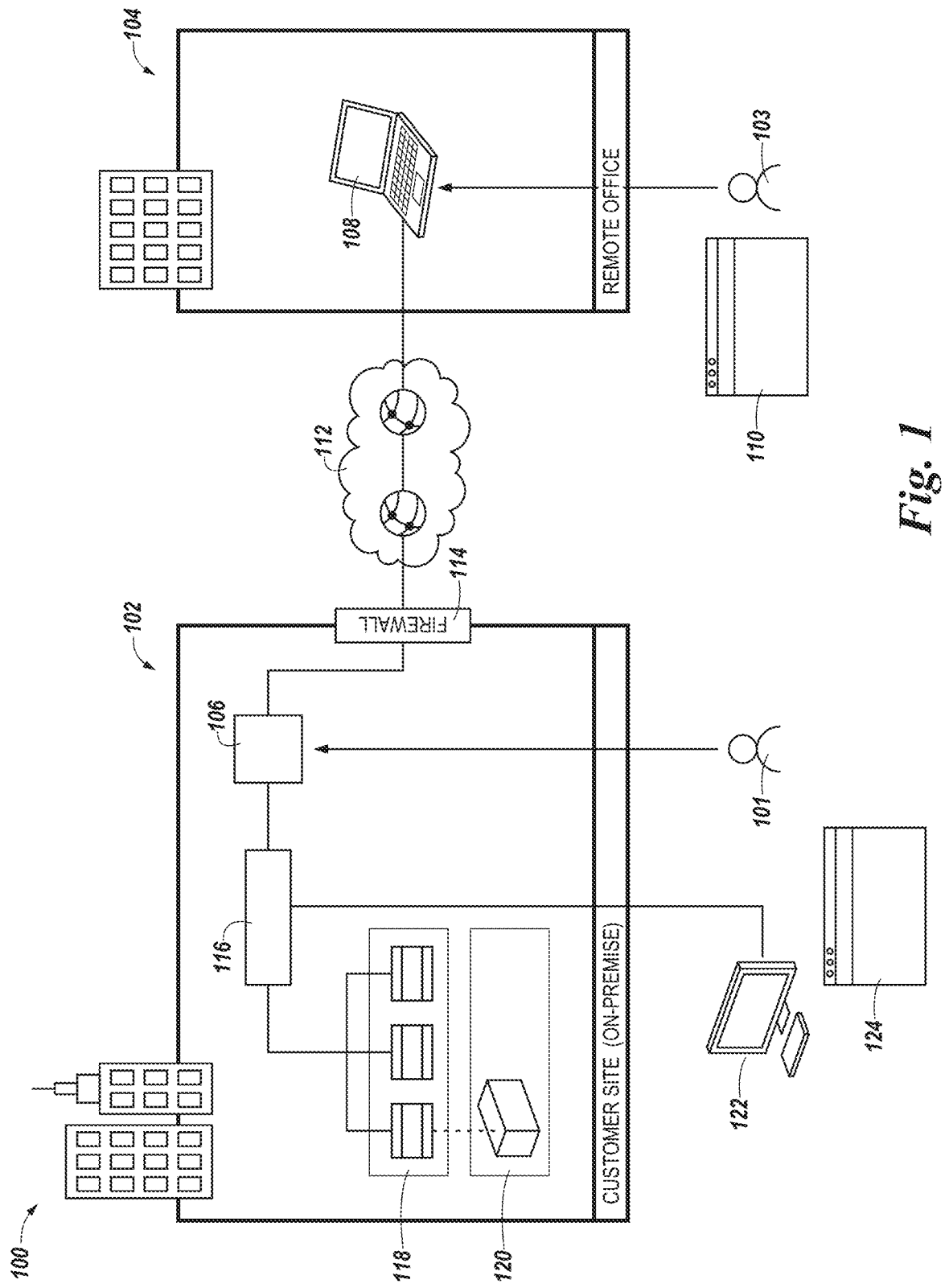
FIG. 1 illustrates a system for rule-based modeling for building control systems in accordance with an embodiment of the present disclosure.

Rule-based modeling for building control systems is described herein. For example, an embodiment includes a memory, a user, interface, and a processor configured to execute executable instructions stored in the memory to display, in a single view on the user interface, a listing of all components of a facility controlled by a building control system, display, in an additional view on the user interface, a number of rules for mapping the components of the facility to a common model of the building control system, map the components of the facility to the common model by applying the number of rules to the components of the facility, and display, in the additional view on the user interface, the components of the facility that have been mapped to the common model.

A centralized mechanism, which may be referred to herein as a "gateway", may serve as a middle layer between the various building control systems deployed at various facilities (e.g., sites). For example, the various building control systems may have different structures and/or formats for their respective components (e.g., devices, controllers, equipment, points of interest, etc.). Such a gateway may provide a common, normalized model of component data from the components controlled by the various building control systems, such that the data can take the same format for monitoring, managing, reporting, and/or analysis, regardless of the building control system (e.g., the structure and/or format of the building control system) from which it comes.

In order to establish an existing gateway system, however, a user (e.g., a site engineer or system integrator) may have to become familiar with the unique configuration of each different facility, discover and interpret the various components of each facility, and manually apply (e.g., add) modeling tags that identify the facility and each individual component within the specific data structure of the building control system for that facility. Such an operation would have to be manually performed for each respective facility (e.g., site) and each respective building control system. Accordingly, the existing process of establishing a gateway system can be difficult and/or time consuming.

Embodiments of the present disclosure, in contrast, may include a rule-based model mapping mechanism that can be included as part of the gateway system. Such a mechanism can make it quicker and easier to onboard the various components of the various facilities into the gateway system than the existing manual approach. Further, such a mechanism may be a generalized tool that is applicable to any type of building control system, without using any custom code modifications.

For example, a rule-based model mapping mechanism (e.g., tool) in accordance with the present disclosure may include an intuitive user interface and workflow that allows the components (e.g., devices, controllers, equipment, points of interest, etc.) controlled by different building control systems at different facilities (e.g., different sites) to be quickly managed in a single view. For instance, the single view may show all the different components controlled by the different building control systems in a tabular format, along with relationships, model tags, and other information.

Further, a rule-based model mapping mechanism in accordance with the present disclosure may provide the ability to create filter rules that can map the different components to a specialized tag rule, which can result in the components of an entity being mapped to a consistent model. For instance, a common set of filter rules that identify a group of components of a common type may be created. Further, the user can configure the filter rules, and preview how the rules identify the correct component entities. Further, automatic tagging can be performed when specialized tag rules qualify an entity based on the filter rules.

Further, the filter rules can be stored (e.g., persisted) in a common shared location, which can allow the subsequent on-boarding of additional facilities to be quick and easy, as the previous filter rules have already been established and are accessible by the gateway. For example, the previous filter rules can be utilized for the next site. Further a rule-based model mapping mechanism in accordance with the present disclosure can be reconfigured to include new models, new filter rules, and/or new tag rules with no software updates.

In the following detailed description, reference is made to the accompanying drawings that form a part hereof. The drawings show by way of illustration how one or more embodiments of the disclosure may be practiced.

These embodiments are described in sufficient detail to enable those of ordinary skill in the art to practice one or more embodiments of this disclosure. It is to be understood that other embodiments may be utilized and that mechanical, electrical, and/or process changes may be made without departing from the scope of the present disclosure.

As will be appreciated, elements shown in the various embodiments herein can be added, exchanged, combined, and/or eliminated so as to provide a number of additional embodiments of the present disclosure. The proportion and the relative scale of the elements provided in the figures are intended to illustrate the embodiments of the present disclosure, and should not be taken in a limiting sense.

The figures herein follow a numbering convention in which the first digit or digits correspond to the drawing figure number and the remaining digits identify an element or component in the drawing. Similar elements or components between different figures may be identified by the use of similar digits. For example, 108 may reference element "08" in FIG. 1, and a similar element may be referenced as 208 in FIG. 2.

As used herein, "a" or "a number of" something can refer to one or more such things, while "a plurality of" something can refer to more than one such things. For example, "a number of devices" can refer to one or more devices, while "a plurality of devices" can refer to more than one device.

FIG. 1 illustrates a system 100 for rule-based modeling for building control systems in accordance with an embodiment of the present disclosure. As shown in FIG. 1, system 100 includes a facility (e.g., site) 102 having components controlled by a building control system, and a remote location 104 at which a system integrator (SI) 103 can connect to the building control system via a remote management application 110 accessed via a remotely located device 108. Although not illustrated in FIG. 1 for simplicity and so as not to obscure embodiments of the present disclosure, system 100 may include additional sites having components controlled by different building control systems, to which SI 103 can connect from remote location 104 in an analogous manner.

The connection between the building control system at site 102 and remote location 104 can be accomplished by communication between a gateway device 106 at site 102 and remotely located device 108 through an intermediary network 112. For instance, network 112 can be a network relationship through which gateway device 106 and remotely located device 108 communicate. Examples of such a network relationship can include a distributed computing environment (e.g., a cloud computing environment), a wide area network (WAN) such as the Internet, a local area network (LAN), a personal area network (PAN), a campus area network (CAN), or metropolitan area network (MAN), among other types of network relationships. The communication may also traverse through a firewall 114 provided by a network device at site 102. Further, although not illustrated in FIG. 1 for simplicity and so as not to obscure embodiments of the present disclosure, system 100 can include additional gateway devices.

As used herein, a "network" can provide a communication system that directly or indirectly links two or more computers and/or peripheral devices and allows users to access resources on other computing devices and exchange messages with other users. A network can allow users to share resources on their own systems with other network users and to access information on centrally located systems or on systems that are located at remote locations. For example, a network can tie a number of computing devices together to form a distributed control network (e.g., cloud).

A network may provide connections to the Internet and/or to the networks of other entities (e.g., organizations, institutions, etc.). Users may interact with network-enabled software applications to make a network request, such as to get a file or print on a network printer. Applications may also communicate with network management software, which can interact with network hardware to transmit information between devices on the network.

Site 102 may include a number of network devices. For instance, in the example illustrated in FIG. 1, site 102 includes a network device 116 (e.g., a switch, hub, router, etc.) that connects gateway 106 to other devices within the network. However, in some embodiments, gateway 106 may be directly connected to one or more network devices.

The network devices may also include a number of connected components 120 controlled by the building control system of site 102, and a number of controllers 118 of the building control system of site 102 that provide functionality to control the operation of components 120. The building control system of site 102 may be controlled via operating protocol software 124 on computing device 122. For instance, operating protocol software 124 may control components 120 either directly or indirectly (e.g., via controllers 118).

The components 120 controlled by the building control system of site 102 can include, for example, equipment, devices, objects, zones (e.g., rooms, areas, spaces, floors, etc.), networks, sensors, and/or component connections, among others. For instance, in an example in which the building control system is a building automation system (BAS) that controls a refrigeration system of site 102, components 120 may include refrigeration and/or freezer cases (e.g., refrigeration and/or freezer display cases and/or walk in coolers), refrigeration circuits, sensors, refrigeration racks, compressors, fans, tanks, and/or evaporators, among others. As an additional example in which the building control system is used to control a heating, ventilation, and air conditioning (HVAC) system of site 102, components 120 may include heating and/or cooling valves, chillers, boilers, pumps (e.g., hot and/or chilled water pumps), fans, compressors, air dampers (e.g., VAV dampers), air handling units, coils (e.g., heating and/or cooling coils), air filters, cooling towers, duct work pipes, ventilation, and/or electrical and/or gas distribution equipment, among others. However, embodiments of the present disclosure are not limited to these examples. Further, although one component 120 is illustrated in FIG. 1 for simplicity and so as not to obscure embodiments of the present disclosure, site 102 may include a plurality of connected components controlled by the building control system.

The components 120 may also include a number of points of interest from which data can be provided. This data can provide, for example, information about a condition at site 102, the status of the component with which the point of interest is associated, and/or status information about other network devices at site 102. For example, this data can include refrigeration case temperature and/or pressure, defrost status, HVAC zone temperature and/or humidity, among other types of data. However, embodiments of the present disclosure are not limited to these examples.

In the embodiment shown in FIG. 1, site engineer 101, who can be a laborer not familiar with the operating protocol of the building control system of site 102 or familiar with the various network devices located at site 102 (e.g., device types, capabilities, configuration settings, etc.) can install gateway device 106 during a set up of a new building control system at site 102 or into a legacy system. In the embodiment shown in FIG. 1, this installation can be accomplished by connecting gateway device 106 to network device 116 (which is connected to controllers 118 and components 120) and to network 112 that allows gateway device 106 to communicate with remote management application 110.

Further, during the installation of gateway device 106 (e.g., during the set up of the building control system network for site 102) site engineer 101 can provide site specific information. This information can be saved within a site component in the site network, and can include information associated with (e.g. about) the site such as, for instance, customer name, vendor name, location (e.g., city, state, country, coordinates), and/or type, and/or number of the site.

It can be noted from the embodiment shown in FIG. 1 that in the past, SI 103 would need to be present at site 102 (e.g., potentially taking the place of the site engineer 101) and would need to configure the building control system and gateway device from site 102. When done with that configuration, SI 103 would need to travel to the next site and configure its building control system and gateway device, and so on until all sites had been set up.

In contrast, in embodiments of the present disclosure, SI 103 can stay at remote location 104 and remotely connect to and configure the building control systems and gateway devices of multiple sites (similar to 102) in rapid succession. For example, SI 103 can use remotely located device 108 to establish and use a gateway system that utilizes a rule-based model mapping mechanism to onboard the various components of the various facilities into the gateway system, as will be further described herein.

Figure 2:
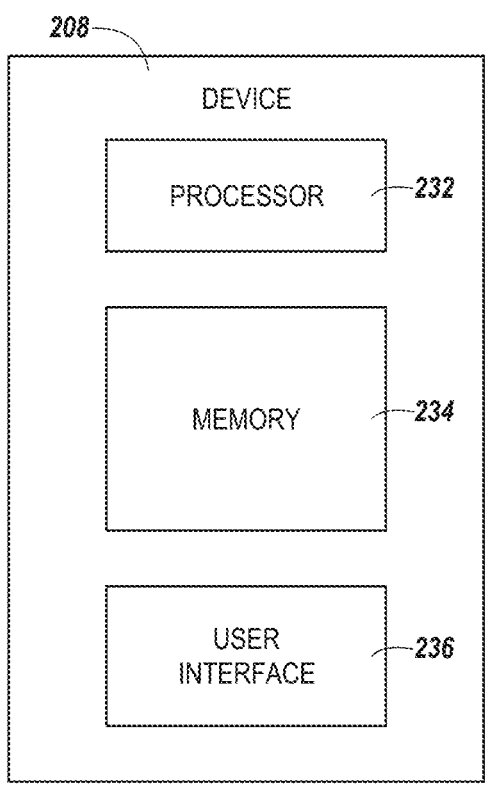
FIG. 2 illustrates a device for rule-based modeling for building control systems in accordance with an embodiment of the present disclosure.

FIG. 2 illustrates a device 208 for rule-based modeling for building control systems in accordance with an embodiment of the present disclosure. Device 208 can be, for example, device 108 previously described in connection with FIG. 1. Device 208 can be, for example, a computing device, such as a laptop computer, desktop computer, or tablet. However, embodiments of the present disclosure are not limited to a particular type of computing device.

As shown in FIG. 2, device 208 can include a processor 232 and a memory 234. Memory 234 can be any type of storage medium that can be accessed by processor 232 to perform various examples of the present disclosure. For example, memory 234 can be a non-transitory computer readable medium having computer readable instructions (e.g., computer program instructions) stored thereon that are executable by processor 232 to provide rule-based modeling for building control systems in accordance with the present disclosure. That is, processor 232 can execute the executable instructions stored in memory 234 to provide rule-based modeling for building control systems in accordance with the present disclosure.

Memory 234 can be volatile or nonvolatile memory. Memory 234 can also be removable (e.g., portable) memory, or non-removable (e.g., internal) memory. For example, memory 234 can be random access memory (RAM) (e.g., dynamic random access memory (DRAM), resistive random access memory (RRAM), and/or phase change random access memory (PCRAM)), read-only memory (ROM) (e.g., electrically erasable programmable read-only memory (EEPROM) and/or compact-disk read-only memory (CD-ROM)), flash memory, a laser disk, a digital versatile disk (DVD) or other optical disk storage, and/or a magnetic medium such as magnetic cassettes, tapes, or disks, among other types of memory.

Further, although memory 234 is illustrated as being located in device 208, embodiments of the present disclosure are not so limited. For example, memory 234 can also be located internal to another computing resource (e.g., enabling computer readable instructions to be downloaded over the Internet or another wired or wireless connection).

As shown in FIG. 2, device 208 can include a user interface 236. User interface 236 can include and/or refer to a mechanism via which a user (e.g., SI 103 previously described in connection with FIG. 1) can interact with device 208. For example, user interface 236 can provide (e.g., display) information to, and receive information from (e.g., input by), the user, including information associated with the rule-based modeling for building control systems provided by device 208, as will be further described herein. In an embodiment, user interface 236 can be a graphical user interface (GUI) that can include a display (e.g., a screen and/or monitor) that can provide and/or receive information to and/or from the user. The display can be, for instance, a touch-screen (e.g., the GUI can include touch-screen capabilities). As an additional example, user interface 236 can include a keyboard and/or mouse the user can use to input information. Embodiments of the present disclosure, however, are not limited to a particular type of user interface.

Device 208 can provide a rule-based model for a building control system, such as the building control system of facility (e.g., site) 102 previously described in connection with FIG. 1. This model can be a common model that can be used (e.g., applied) across different building control systems of different facilities (e.g., different sites). For example, the model may use a common set of rules that can identify a group of components of a common type, regardless of the building control system that is used to control those components.

For example, device 208 can provide (e.g., display) two user views associated with the rule-based model mapping mechanism (e.g., tool) of the present disclosure. The first user view may be referred to herein as the point validation view, and the additional user view may be referred to herein as model mapper view.

The first user view (e.g., the point validation view) can be used to view how the facility is currently modeled. For example, user interface 236 may display, in a single view, a listing of all components (e.g., components 120 previously described in connection with FIG. 1) of the facility controlled by the building control system. For instance, all the equipment and points of interest of the facility controlled by the building control system can be found in the single view, instead of the user (e.g. SI) having to navigate throughout the different gateway device networks. The listing of all the components may be displayed in the single view in a tabular format, for example.

Further, the listing of all the components displayed in the single view may provide an indication of which of the components have already been mapped to the model, and an indication of which of the components have not yet been mapped to the model. For instance, the user can determine (e.g., see) which equipment and points of interest have been mapped to the model, and which equipment and points of interest have not been mapped. Further, the single view may also include (e.g., show) a percentage indicating how much of the site (e.g., the percentage of the components) that has been mapped to the model.

Further, any components that are not a part of (e.g., that are not to be mapped to) the model can be removed from the listing displayed in the single view. For example, the user can remove from the listing any components that he or she knows are not a part of the model by adding those components to a master exclusion list. An example of the point validation view will be further described herein (e.g., in connection with FIG. 3).

After the user has removed the components that are not a part of the model, the display on user interface 236 may switch (e.g., pivot) from the point validation view to the additional user view (e.g., the model mapper view). For example, user interface 236 may switch from displaying the single view to displaying the additional view responsive to an input (e.g., a selection) received from the user in the single view.

The user can then use the model mapper view to begin writing new rules (e.g, filter rules) and/or adjusting existing rules to ensure all components that are a part of the model are properly mapped to the model. For example, the model mapper view can provide (e.g., be used to create) a user-modifiable set of filter rules that can be configured to map any un-mapped equipment and points of interest to the common model.

For example, user interface 236 may display, in the additional view (e.g., the model mapper view), a number of filter rules for mapping the components of the facility to the common model. The number of rules may be, for example, rules for mapping the components in (e.g., belonging to) a particular model entity of the facility to the common model. For instance, user interface 236 may receive a selection of the particular model entity in the model mapper view, and display the number of rules for mapping the components in the particular model entity to the common model in the model mapper view responsive to receiving the selection of that model entity. As an example, the user may select the model entity name from a drop down selector in the model mapper view, and the set of filter rules for that model entity may then be retrieved from a rule dictionary of the building control system and displayed in filter boxes on one side (e.g., the right side) of the model mapper view. The rules that are displayed may also be determined based on the information associated with (e.g., about) the facility (e.g., customer and vendor names) that was provided during the set up of the building control system network for the facility.

As an example, the number of rules can include a rule for mapping the components of the facility (e.g., the components in the particular model entity of the facility) to the common model based on the name pattern of the components. Such a rule can be inclusive or exclusive. As an additional example, the number of rules can include a rule for mapping the components of the facility to the common model based on the type of the components, and/or a rule for mapping the components to the common model based on the properties of the components. These rule examples will be further described herein.

The components of the facility (e.g., the components of the facility in the particular model entity of the facility) can be mapped to (e.g., into) the common model by applying the number of rules to the components. Applying the number of rules can include, for instance, determining which of the components of the facility match the number of rules, tagging the components determined to match the rules, and mapping the tagged components to the common model.

In an example, a point of interest or equipment may be automatically mapped to the common model when the particular entity is identified by applying the filter rules. This automated mapping may be done by a specialized dictionary tag rule that is directly tied to the corresponding set of rules for that point of interest or equipment. This tag rule may be a part of a set of tag rules for each point of interest or equipment in the model that is stored in a single dictionary. An example of such a tag rule from the dictionary will be further described herein (e.g., in connection with FIG. 5).

As an example in which the number of rules can include an inclusive and/or exclusive rule for mapping the components of the facility (e.g., the components in the particular model entity of the facility) to the common model based on the name pattern of the components, a rule for mapping the components of the facility to the common model based on the type of the components, and/or a rule for mapping the components to the common model based on the properties of the components, the first rule that may be applied may be component type rule. If no types have been specified, then this rule may be skipped in checking for matches; if types have been specified, then it is determined whether the component is one of those types. If not, the match fails, and the component will not be tagged (e.g., marked) as a selected entity type.

Continuing in the example, if the component is determined to be one of the types (e.g., if the component passes the type check), the excluded pattern rule may be applied next. These can be regular expressions that are checked against the name of the component. If the name of the component matches any of the excluded patterns, the match fails, and the component is not marked with the selected entity type.

Continuing in the example, after the component type rule and the excluded pattern rule are applied, the included pattern rule and the property rule are applied. The included patterns can be a list of regular expressions that are checked against the name of the component. If the name of the component matches any of the included patterns, that component passes the included pattern check, and is marked as being the selected model entity.

Continuing in the example, if the name of the component does not match any of the included patterns, the property rule may then be applied. The property rule may give a regular expression and a path to a property that should be checked, which allows the user to test anything the user would want about the component, and to check against vendor-specific information. The value of the property given can be tested against the regular expression.

User interface 236 may display, in the model mapper view, the components of the facility (e.g., the components of the facility in the particular model entity of the facility) that have been mapped to the common model as a result of applying the number of rules (e.g., the components that have been determined to match the rules and have been tagged). For instance, the equipment and points of interest that have been mapped to the common model may be shown in the other side (e.g., the left side) of the model mapper view.

The user may then adjust (e.g., edit) one or more of the number of rules. For example, the user may enter the adjustment of a rule into the filter box for that rule displayed in the model mapper view. Additionally or alternatively, the user may enter an additional (e.g. new) filter rule for mapping the components of the facility (e.g., the components in the particular model entity of the facility) to the common model. For example, once a model entity has been selected, the user can start adding filter rules for that entity. If the facility is the first facility of a particular vendor to be mapped to the common model, then new filter rules may need to be created to qualify most, if not all, of the equipment and points of interest. By using regular expressions for the rules, the user can create (e.g., write) flexible rules that can be used to map any and all equipment and points of interest to the proper model entity, as different building control systems across different facilities may have some level of consistency in their naming and structure.

The modified set of filter rules (e.g., reflecting the rule adjustments and/or rule additions made by the user) can be displayed in the model mapper view, and the components of the facility (e.g., the components of the facility in the particular model entity of the facility) can be mapped to (e.g., into) the common model by applying the modified (e.g., adjusted and/or added) rules to the components. For instance, any previously un-mapped equipment and points of interest can be mapped to the common model by determining which of the components of the facility now match the modified rules, tagging the components determined to match the modified rules, and mapping the tagged components to the common model. In an example, the modified rules may be applied to map the components to the common model responsive to an input (e.g., a selection) received from the user in the model mapper view.

User interface 236 may display, in the model mapper view, the components of the facility (e.g., the components of the facility in the particular model entity of the facility) that have been mapped to the common model as a result of applying the modified rules (e.g., the components that have been determined to match the modified rules and have been tagged). For instance, the equipment and points of interest that have now been mapped to the common model may be shown in the other side (e.g., the left side) of the model mapper view, along with those that were previously mapped. An example of the model mapper view will be further described herein (e.g., in connection with FIG. 4).

In such a manner, embodiments of the present disclosure can provide the ability to create a corresponding set of filter rules for each tag rule, where the set of rules may be defined one (e.g., a single) time and maintained for each customer and/or vendor because the same filter rules may be used for all sites that have the same building control system vendor. This can allow for faster onboarding as the tag rules are used (e.g., mature). Meanwhile, each combination of customer and building control system may have a different set of rules.

The user can alternate between the point validation view and the model mapper view to change how the components of the facility are modeled until all the components have been mapped to the model. For example, the display on user interface 236 may switch back from the model mapping view to the point validation view, with the listing of all the components displayed in the single view (e.g., the indication of which components have been mapped to the model) updated to reflect the mapping that was performed while in the previous model mapping view. Any components that are not a part of the model can be removed from the listing, in a manner analogous to that previously described herein.

The display on user interface 236 may then be switched back to the model mapping view to continue the component mapping process. For example, user interface 236 may display, in the model mapper view, an additional number of filter rules for mapping the components of the facility to the common model. The additional number of rules may be, for example, rules for mapping the components in (e.g., belonging to) a different model entity of the facility to the common model. The components of the facility (e.g., the components of the facility in the different model entity of the facility) can be mapped to the common model by applying the additional number of rules to the components that have not yet been mapped to the common model, in a manner analogous to that previously described herein.

User interface 236 may display, in the model mapper view, the components of the facility (e.g., the components of the facility in the different model entity of the facility) that have now been mapped to the common model as a result of applying the additional number of rules, in a manner analogous to that previous described herein. Further, the user can adjust the rules and/or add new rules, and the components can be mapped by applying the modified rules, in a manner analogous to that previously described herein. The newly mapped components may be displayed in the model mapper view, in a manner analogous to that previously described herein. This process can continue in an analogous manner, until all components have been mapped to the common model. Once the components have been mapped to the common model, the user can use the common model to control (e.g., set, monitor, adjust, etc.) the operation of the components.

Further, the building control systems of additional (e.g., subsequent) sites to be modeled can leverage the filter rules used to model the building control systems of previous sites, which can significantly reduce the amount of time needed to map the components of those additional sites. For instance, once all the components controlled by the building control system of one facility have been mapped to the common model using a set of filter rules, the components controlled by the building control system of the next facility can be mapped to the common model by applying the same set of filter rules to those components.

For example, user interface 236 may display, in a single view (e.g., point validation view), a listing of all components of the additional site controlled by the building control system, and any of those components that are not a part of the model can be removed from the listing, in a manner analogous to that previously described herein for the previous site. The display on user interface 236 may then switch from the point validation view to an additional user view (e.g., model mapper view), in which the number of filter rules for mapping the components of the previous facility to the common model may be displayed, in a manner analogous to that previously described herein for the previous site.

The components of the additional site can be mapped to the common model by applying the number of rules used for the previous site to the components of the additional site, and user interface 236 may display, in the model mapper view, the components of the additional site that have been mapped to the common model as a result of applying the number of rules, in a manner analogous to that previously described herein for the previous site. Further, the user may adjust one or more of the number of rules, and/or may enter an additional (e.g. new) filter rule for mapping the components of the additional site to the common model, in a manner analogous to that previously described herein for the previous site. The mapping process for the additional site can continue with the modified set of rules, and can continue until all components of the additional site have been mapped to the common model, in a manner analogous to that previously described herein for the previous site.

Figures 5, 6:
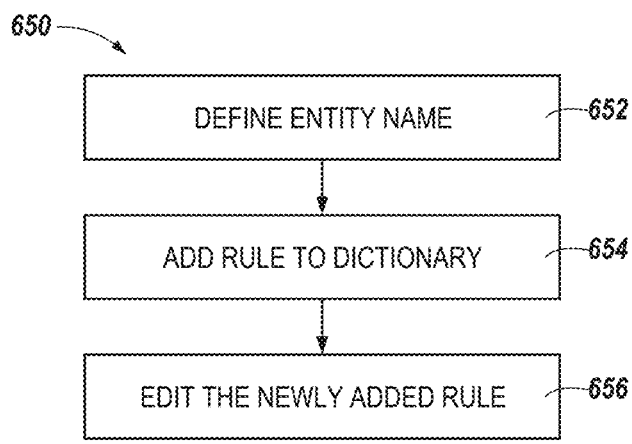
FIG. 5 illustrates an example screen shot displayed during a rule-based modeling for a building control system in accordance with an embodiment of the present disclosure.
FIG. 6 illustrates an example of a method performed during a rule-based modeling for a building control system in accordance with an embodiment of the present disclosure.

FIGS. 3, 4, and 5 illustrate example screen shots 340, 442, and 544, respectively, that may be displayed during a rule-based modeling for a building control system in accordance with an embodiment of the present disclosure. Screen shots 340, 442, and 544 may be displayed, for example, on user interface 236 of device 208 previously described in connection with FIG. 2.

Screen shot 340 illustrated in FIG. 3 can be an example of a point validation view that can be used to view how a facility is currently modeled. For example, as shown in FIG. 3, the point validation view in screen shot 340 includes a listing of all components of the facility controlled by the building control system in a tabular format in a single view.

Further, the point validation view in screen shot 340 may provide an indication of which of the components have already been mapped to the common model, and an indication of which of the components have not yet been mapped to the model. Further, the point validation view in screen shot 340 may also include a percentage indicating the percentage of the components that have been mapped to the model. In the example illustrated in FIG. 3, screen shot 340 is indicating that none (e.g., 0%) of the components have been mapped to the model yet. For instance, screen shot 340 illustrates the initial state of the facility, in which no filter rules are yet in place.

Any components shown in the point validation view in screen shot 340 that are not a part of the model can be removed from the listing. For example, the user can select the "Edit Point Exclusion List" button shown in screen shot 340 to place any of the components that he or she knows are not a part of the model on a master exclusion list.

As shown in FIG. 3, the point validation view in screen shot 340 may include an "Edit Model Mapper" button. The user may select this button to switch from the point validation view to a model mapper view (e.g., the model mapper view in screen shot 442 shown in FIG. 4).

Screen shot 442 illustrated in FIG. 4 can be an example of a model mapper view that can provide (e.g., be used to create) a user-modifiable set of filter rules for mapping any un-mapped components (e.g., equipment and points of interest) to the common model. For example, as shown in FIG. 4, the model mapper view in screen shot 442 includes a number of filter rules (e.g., "Included Patterns", "Property Rules", "Included Types", and "Excluded Patterns") for mapping the components in (e.g., belonging to) a particular model entity (e.g., the model entity "circuit") of the facility to the common model. In the example illustrated in screen shot 442 of FIG. 4, the filter rules will exclude from the model any circuit of the site that includes "EVAP FAN", and will include in (e.g., map to) the model any circuit of the site that that starts with an alphanumeric character, at least one digit, and a space or an asterisk.

As shown in FIG. 4, the model mapper view in screen shot 442 may include a drop down selector menu from which the user may select the particular model entity. Further, as shown in FIG. 4, the set of filter rules for that model entity may be displayed in filter boxes on one side (e.g., the right side) of the model mapper view in screen shot 442.

As shown in FIG. 4, the other (e.g., left) side of the model mapper view in screen shot 442 may display the components of the facility in the model entity that match the set of filter rules and have been mapped to the common model accordingly. The determination of which components match the set of filter rules may occur responsive to the user selecting the "Apply Filters" button shown in screen shot 442.

The set of filter rules shown in the model mapper view in screen shot 442 can be modified (e.g., by the user) in screen shot 442. For example, as shown in FIG. 4, the model mapper view can include a filter box for each respective rule shown in screen shot 442, and the user may adjust (e.g., edit) a rule by entering the adjustment into the filter box for that rule. Additionally or alternatively, the user may enter an additional (e.g. new) filter rule into the model mapper view in screen shot 442. A determination of which components would match the modified set of filter rules, and therefore would be mapped to the common model, can be made responsive to the user selecting the "Apply Filters" button after making the modification(s) to the rules.

Screen shot 544 illustrated in FIG. 5 can be an example of a tag rule from (e.g., stored in) the tag dictionary. The tag rule shown in screen shot 544 is a tag (e.g., model match) rule for the model entity "caseTemp". If the condition of the tag rule (e.g., the "Model Match Condition" illustrated in FIG. 5) is matched true for a component, then that component (e.g., the matching equipment or point of interest) will have the tags in the tag list (e.g., "caseTemp", "casePerformance", "caseDeviation", "no:entityType", "refrig", and "hs:refrig") applied. If the component qualifies with the filter rules for that model entity, the component will be mapped to the common model.

Figure 7:
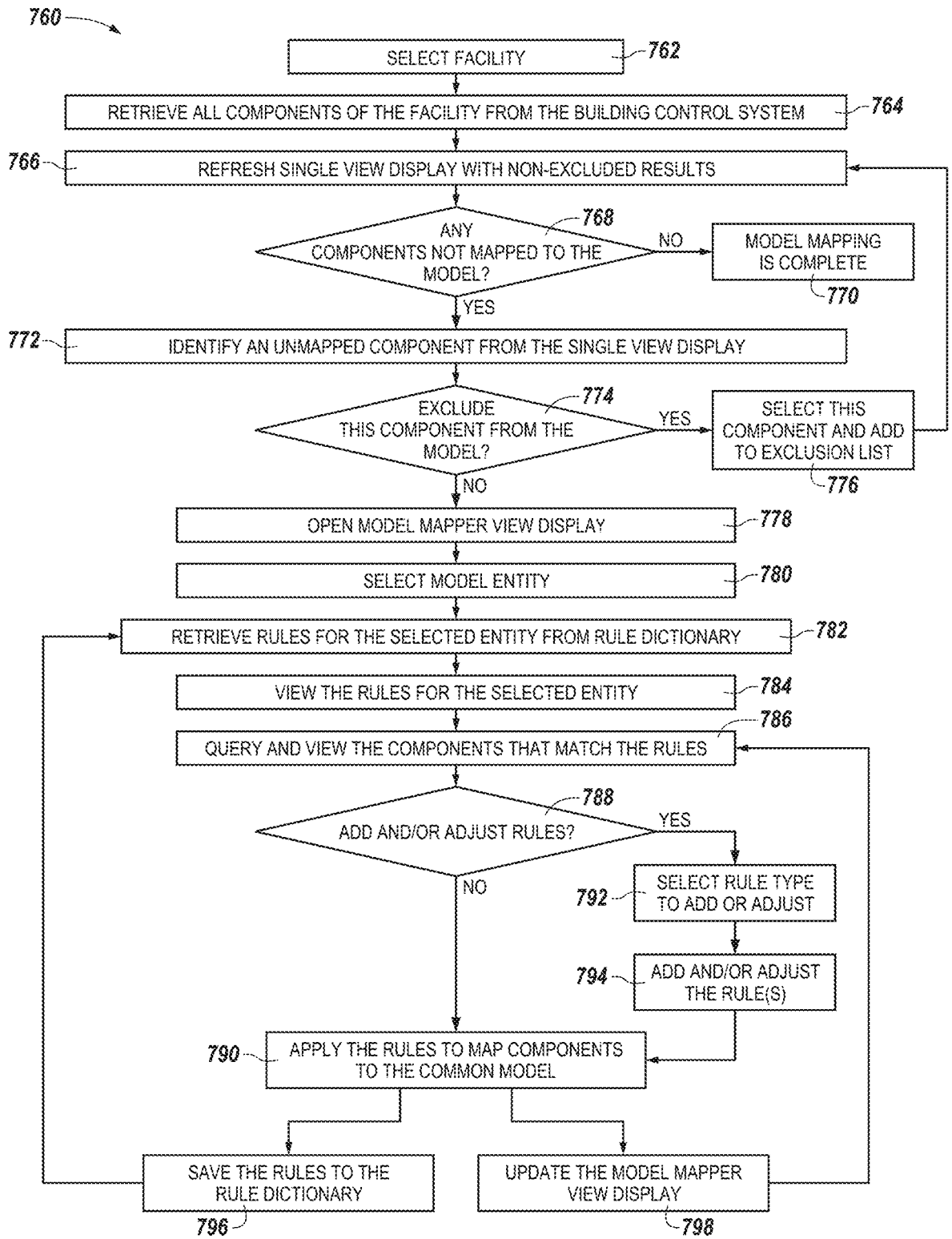
FIG. 7 illustrates an example of a method performed during a rule-based modeling for a building control system in accordance with an embodiment of the present disclosure.
Figure 8:
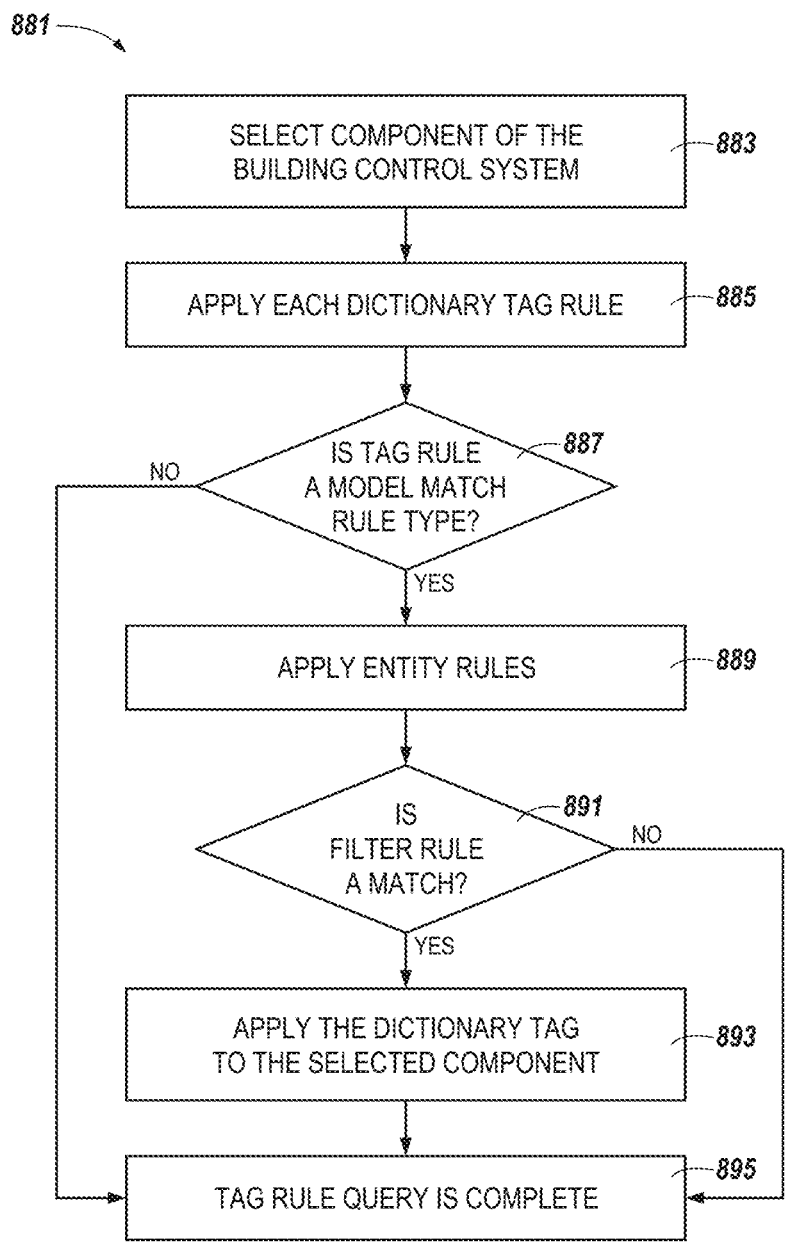
FIG. 8 illustrates an example of a method performed during a rule-based modeling for a building control system in accordance with an embodiment of the present disclosure.

FIGS. 6, 7, and 8 illustrate examples of methods 650, 760, and 881, respectively, performed during a rule-based modeling for a building control system in accordance with an embodiment of the present disclosure. Methods 650, 760, and 881 can be performed by, for example, device 208 previously described in connection with FIG. 2.

Method 650 illustrated in FIG. 6 illustrates a portion of the setup of the tag dictionary. For example, method 650 illustrates the addition of a tag (e.g., model match) rule for a model entity.

At block 652, method 650 includes defining the model entity name. At block 654, method 650 includes adding the tag (e.g. model match) rule for that entity to the tag dictionary. For example, the tag rule may be added to the tag dictionary using the defined entity name as the rule name.

At block 654, method 650 includes editing the newly added tag rule. For example, the newly added tag rule may be edited by specifying the model entity name in the "Model Match Condition" in screen shot 544 described in connection with FIG. 5.

Method 760 illustrated in FIG. 7 illustrates a user workflow for utilizing the rule-based model mapping mechanism (e.g., tool) of the present disclosure. For example, method 760 illustrates the use of the point validation view and model mapper view previously described in connection with FIGS. 2-4.

At block 762, method 760 includes selecting the facility for which the model mapping mechanism is to be utilized. This selection can be based on, for instance, the customer name and/or vendor name associated with the facility (e.g., with the building control system of the facility).

At block 764, method 760 includes retrieving all components of the selected facility from the building control system of the facility. This can include, for instance, querying for all equipment and points of interest from the building control system.

At block 766, method 760 includes refreshing the single view display of the point validation view with the nonexcluded results, such that all components that are currently part of (e.g., either mapped or to be mapped to) the model are listed in the point validation view. This listing can be, for instance, in a table view, as previously described herein.

At block 768, method 760 includes determining whether any of the components in the single view display are not currently mapped to the model. This can include, for instance, determining whether any of the points of interest or equipment are mapped with a model entity tag. If none of the components in the single view display are not currently mapped to the model (e.g., if all the components in the single view display are currently mapped to the model), the model mapping is complete at block 770. If any of the components in the single view display are not currently mapped to the model, method 760 proceeds to block 772.

At block 772, method 760 includes identifying an unmapped component (e.g., a single unmapped component) from the single view display. This can include, for instance, identifying a single unmapped entry from the table in the single view display.

At block 774, method 760 includes determining whether to exclude the identified unmapped component from the model (e.g., whether to remove that component from the component list in the single view display). This determination can be made based on, for example, the name of the component and/or the type of the component.

If it is determined to exclude the identified unmapped component from the model at block 774, that component is selected and added to the master exclusion list at block 776, and method 760 then returns to block 766. If it is determined to not exclude the identified unmapped component from the model (e.g., it is determined that component is to be mapped to the model), method 760 proceeds to block 778.

At block 778, method 760 includes opening the model mapper view display. This can include, for example, switching from the point validation view to the model mapper view, as previously described herein.

At block 780, method 760 includes selecting a model entity (e.g., the name of the model entity) in the model mapper view display. At block 782, method 760 includes retrieving the tag rules for the selected entity from the tag rule dictionary. Retrieving the tag rules can include, for instance, loading the tag rules from a customer and/or vendor specific file. At block 784, method 760 includes viewing the retrieved tag rules for the selected entity.

At block 786, method 760 includes querying and viewing, in the model mapper view display, the components that match the filter rules for the selected model entity. These filter rules can include, for example, rules for mapping the components in the selected model entity of the facility to the common model based on the name pattern of the components, the type of the components, and/or the properties of the components, as previously described herein.

At block 788, method 760 includes determining whether to add a filter rule, and/or whether to adjust (e.g., edit) any of the filter rules. If it is determined not to add or adjust a filter rule, the filter rules are applied to the components in the selected model entity to map the components to the common model at block 790.

If it is determined to add or adjust a filter rule, the rule type to be added or adjusted is selected at block 792, and the rule(s) are adjusted and/or added at block 794. The modified filter rules (e.g., reflecting the added and/or updated rules) can then be applied to the components in the selected model entity to map the components to the common model at block 790.

At block 796, method 760 includes saving the filter rules to the tag rule dictionary. For instance, the filter rules can be saved to the specific customer and/or vendor file. Method 760 may then return to block 782. Additionally and/or alternatively, at block 798 method 760 includes updating the model mapper view display to reflect the components that have been mapped the common model. Method 760 may then return to block 786.

Method 881 illustrated in FIG. 8 illustrates a tag rule query, depicting the use or query of a model entity when the validation of a tag (e.g., model match) rule is invoked, such as, for instance, at blocks 764, 780, and/or 782 of method 760 previously described in connection with FIG. 7. This query may cause the model mapping filter rules to be evaluated, resulting in the dictionary tag being applied to the selected model entity.

At block 883, method 881 includes selecting a component of (e.g., controlled by) the building control system. At block 885, method 881 includes applying each dictionary tag rule.

At block 887, method 881 includes determining if a tag rule is a model match rule type. If no tag rule is determined to be a model match rule type, the tag rule query is complete at block 895. If a tag rule is determined to be a model match rule type, the method 887 proceeds to block 889.

At block 889, method 881 includes applying the tag rules for the entity. These rules can be retrieved, for example, from the specific customer and/or vendor file, as previously described herein.

At block 891, method 881 includes determining if a filter rule is a match. If no filter rule is determined to be a match, the tag rule query is complete at block 895. If a filter rule is determined to be a match, method 881 proceeds to block 893. At block 893, method 881 includes applying the dictionary tag to the selected component, and the tag rule query is then complete at block 895.

Although specific embodiments have been illustrated and described herein, those of ordinary skill in the art will appreciate that any arrangement calculated to achieve the same techniques can be substituted for the specific embodiments shown. This disclosure is intended to cover any and all adaptations or variations of various embodiments of the disclosure.

It is to be understood that the above description has been made in an illustrative fashion, and not a restrictive one. Combination of the above embodiments, and other embodiments not specifically described herein will be apparent to those of skill in the art upon reviewing the above description.

The scope of the various embodiments of the disclosure includes any other applications in which the above structures and methods are used. Therefore, the scope of various embodiments of the disclosure should be determined with reference to the appended claims, along with the full range of equivalents to which such claims are entitled.

In the foregoing Detailed Description, various features are grouped together in example embodiments illustrated in the figures for the purpose of streamlining the disclosure. This method of disclosure is not to be interpreted as reflecting an intention that the embodiments of the disclosure require more features than are expressly recited in each claim.

Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. A system for mapping component data from various components of one or more Building Automation Systems (BAS) to a common model, wherein the common model provides a common normalized model of component data for various components of the one or more Building Automation Systems (BAS) in a common format, comprising:
   one or more memory;
   a user interface;
   one or more processor configured to execute executable instructions stored in the one or more memories to:
      receive a selection of a selected model entity from a user via the user interface;
      display a listing of one or more components that are part of one or more of the Building Automation Systems (BAS) and that are associated with the selected model entity, wherein the listing includes an indication of which of the one or more components have been mapped to the common model and an indication of which of the one or more components have not been mapped to the common model;
      responsive to receiving the selection of the selected model entity, display a number of rules for mapping the component data from at least some of the one or more components that are associated with the selected model entity to the common model while not displaying one or more rules for mapping component data from one or more components that are not associated with the selected model entity;
      map component data from at least some of the one or more components that are associated with the selected model entity to the common model by applying the number of rules to the component data of the at least some of the one or more components that are associated with the selected model entity; and
      display the one or more components associated with the selected model entity that have their component data mapped to the common model.

2. The system of claim 1, wherein at least some of the number of rules are user-modifiable via the user interface, and wherein the one or more processor is configured to execute instructions to:
   receive an adjustment to one or more of the number of rules via the user interface; and
   adjust at least one of the user-modifiable rules based at least in part on the received adjustment.

3. The system of claim 1, wherein the one or more processor is configured to execute instructions to:
   receive a selection of a different model entity that is different from the selected model entity, the selected model entity is associated with components of a first facility and the different model entity is associated with components of a second facility;
   display a listing of one or more components associated with the different model entity, wherein the listing includes an indication of which of the one or more components associated with the different model entity have been mapped to the common model and an indication of which of the one or more components associated with the different model entity have not been mapped to the common model;
   map component data from at least some of the one or more components associated with the different model entity to the common model by applying at least some of the number of rules used for mapping the component data from at least some of the one or more components that are associated with the selected model entity to the common model to the at least some of the components associated with the different model entity to map the component data from at least some of the one or more components that are associated with the different model entity to the common model; and
   display the one or more components associated with the different model entity that have their component data mapped to the common model.

4. The system of claim 1, wherein the one or more processor is configured to execute instructions to:
   receive an additional rule for mapping the component data from at least one of the one or more components that are associated with the selected model entity to the common model; and
   map the component data from the at least one of the one or more components that are associated with the selected model entity to the common model by applying the additional rule to the component data from the at least one of the one or more components.

5. The system of claim 1, wherein the one or more processor is configured to execute the instructions to switch from displaying a single view on the user interface to displaying an additional view on the user interface responsive to an input received from a user in the single view, wherein the additional view displays one or more of the number of rules for mapping the component data from the at least some of the one or more components to the common model.

6. The system of claim 1, wherein the number of rules include one or more filter rules that allow a user to specify a search pattern to identify components with component data that match the search pattern, wherein the search pattern accommodates use of one or more wildcard characters.

7. The system of claim 1, wherein the one or more components include one or more components of a refrigeration system and the one or more components include one or more components of an HVAC system.

8. The system of claim 1, wherein the system includes:
   a remote management application;
   a gateway serving as a middle layer between one or more of the components and the remote management application; and
   wherein the user interface is part of the remote management application.

9. A method mapping component data from various components of one or more Building Automation Systems (BAS) to a common model, wherein the common model provides a common normalized model of component data for various components of the one or more Building Automation Systems (BAS) in a common format, the method comprising:
   receiving a selection of a selected model entity from a user;
   displaying a listing of one or more components that are part of one or more of the Building Automation Systems (BAS) and are associated with the selected model entity, wherein the listing includes an indication of which of the one or more components have been mapped to the common model and an indication of which of the one or more components have not been mapped to the common model;
   responsive to receiving the selection of the selected model entity, displaying a number of user-modifiable rules for mapping the component data from at least some of the one or more components that are associated with the selected model entity to the common model while not displaying one or more rules for mapping component data from one or more components that are not associated with the selected model entity;

adjusting at least one of the number of user-modifiable rules;

mapping component data from at least some of the one or more components that are associated with the selected model entity to the common model by applying the number of user-modifiable rules to the at least some of the components that are associated with the selected model entity; and display the one or more components that are associated with the selected model entity that have their component data mapped to the common model.

10. The method of claim 9, wherein applying the number of user-modifiable rules to the at least some of the components that are associated with the selected model entity after the adjustment includes:

determining which of the one or more components that are associated with the selected model entity match the number of user-modifiable rules after the adjustment;

tagging the components determined to match the number of user-modifiable rules after the adjustment; and mapping the tagged components to the common model.

11. The method of claim 9, wherein the method includes retrieving the number of user-modifiable rules from a rule dictionary.

12. The method of claim 9, wherein the method includes not including in the listing one or more components that are not associated with the selected model entity.

13. The method of claim 9, wherein the number of rules include one or more filter rules.

14. A non-transitory computer readable medium having computer readable instructions stored thereon that are executable by one or more processors to:

receive a selection of a first model entity from a user via a user interface, the first model entity is associated with components of a first facility;

display a listing of one or more components associated with the first facility, wherein the listing includes an indication of which of the one or more components associated with the first facility have been mapped to a common model and an indication of which of the one or more components associated with the first facility have not been mapped to the common model;

responsive to receiving the selection of the first model entity, display a number of rules for mapping the component data from at least some of the one or more components that are associated with the first facility to the common model;

receiving from via the user interface user input that develops the number of rules for mapping the component data from at least some of the one or more components that are associated with the first facility to the common model, the number of rules include one or more filter rules that allow the user to specify a search pattern to identify components that have component data that match the search pattern, wherein the search pattern accommodates use of one or more wildcard characters;

save the number of rules to a rule dictionary;

map equipment and points of interest from at least some of one or more components associated with the first facility to the common model by applying the number of rules to one or more of the components that are associated with the first facility;

display the one or more components associated with the first facility that have their equipment and points of interest mapped to the common model;

receive a selection of a second model entity via the user interface, the second model entity is associated with components of a second facility that is different from the first facility;

retrieve one or more of the rules from the rule dictionary;

map equipment and points of interest from at least some of one or more components associated with the second facility to the common model by applying one or more of the rules developed by the user for the first facility to the components of the second facility; and display the one or more components of the second facility that have their equipment and points of interest mapped to the common model.

15. The non-transitory computer readable medium of claim 14, wherein the number of rules include a rule for mapping the components of the first facility to the common model based on a type of the components of the first facility.

16. The non-transitory computer readable medium of claim 14, wherein the number of rules include a rule for mapping the components of the first facility to the common model based on properties of the components of the first facility.

17. The non-transitory computer readable medium of claim 14, wherein the computer readable instructions are executable by the one or more processors to:

map the components of the first facility to the common model responsive to a first input received from a user; and map the components of the second facility to the common model responsive to a second input received from the user.

* * * * *